Patented June 20, 1933

1,915,108

UNITED STATES PATENT OFFICE

WILLIAM P. TER HORST, OF PACKANACK LAKE, NEW JERSEY, ASSIGNOR TO THE NAUGATUCK CHEMICAL COMPANY, OF NAUGATUCK, CONNECTICUT, A CORPORATION OF CONNECTICUT

PROCESS OF COMBINING DIALKYL KETONES AND SECONDARY AROMATIC AMINES

No Drawing.   Application filed September 24, 1931.   Serial No. 564,973.

This invention relates to the preparation of new rubber antioxidants or age-resisters, namely the reaction products of dialkyl-ketones and diaryl amines.

It is generally known that ketones and primary amines may be reacted by heating the same with or without the presence of a catalyst, but these general procedures are not adapted for bringing about the condensation of ketones such as acetone and secondary aromatic amines devoid of primary amino groups, such as diphenylamine, phenyl beta naphthylamine, p,p'-di(beta naphthylamino) diphenyl methane, phenyl alpha-naphthylamine, dinaphthylamines, sym-dinaphthyl-p-phenylene diamine, and the like. To condense these classes of materials to produce satisfactory antioxidants it has been found that certain temperatures, pressures and catalysts are necessary. In reacting dialkyl-ketones and diarylamines, temperatures considerably in excess of the normal boiling point of the lowest boiling constituent to be reacted are required and the presence of a dehydrating agent such as iodine, which also has a catalytic effect on the reaction.

The following examples illustrate the invention:

*Example 1.*—320 pounds of diphenylamine, 220 pounds of acetone, 600 grams of iodine are heated during 20 hours at approximately 220° C. in an iron autoclave with or without agitation. The pressure is approximately 600 lbs. per sq. inch at this temperature. At the end of about 20 hours the contents are cooled and the excess acetone and the water formed are distilled off. The resulting product is a dark brown liquid which may be used as such or further purified. The reaction time may be shortened by raising the temperature, for example at a temperature of 260° C., a reaction time of 12 hours is sufficient. It has also been found that increasing the amount of iodine shortens the time of reaction, for example the use of 1000 grams of iodine allows a satisfactory reaction at 220° C. in about 12 hours.

*Example 2.*—A mixture of 219 grams of phenyl beta naphthylamine, 696 grams acetone and 10 grams iodine are heated at approximately 210 to 220° C. during 33 hours in an iron autoclave. The pressure at this temperature is approximately 600 lbs. per square inch. The crude reaction product is filtered through glass wool and the excess of acetone and the water formed during the reaction are removed by distillation.

*Example 3.*—219 grams of phenyl alpha naphthylamine, 116 grams acetone and 1.3 grams of iodine are heated during 20 hours at approximately 210 to 220° C. The product after removal of acetone and water is a free flowing oil.

*Example 4.*—The reaction product of acetone and p,p'-di-(naphthylamino) diphenyl methane: The latter compound is first made by heating a mixture of one mole of p,p'-diamino diphenyl methane and 2 moles of beta naphthol at approximately 260° C. during 20 hours in the presence of a dehydrating agent (calcium chloride or iodine). The chemical constitution of this compound is probably as follows:

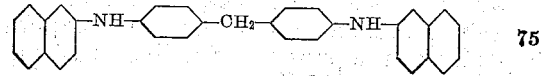

A mixture of 312 grams of p,p'-di(naphthylamino) diphenyl methane, 696 grams of acetone, and 10 grams of iodine is heated during 24 hours at approximately 200° C. After removing the excess of acetone and the water formed during the reaction a solid residue remains.

Other ketones that may be used are diethyl ketone, ethyl methyl ketone, mesityl oxide, phorone, diacetone alcohol, etc. The temperature employed in the reaction should be preferably above 200° C.

Having thus described my invention, what I claim and desire to protect by Letters Patent is:

1. A process of producing a rubber antioxidant by combining dialkyl ketones and secondary aromatic amines of the benzene and naphthalene series which are devoid of primary amino groups which comprises reacting together in the presence of iodine said ketones and said amines at temperatures above 200° C. which are in excess of the normal boiling point of the lowest boiling constituent to be reacted and at pressures higher than normal atmospheric pressure.

2. A process of producing a rubber antioxidant by combining a dialkyl ketone and a secondary aromatic amine of the benzene and naphthalene series and which is devoid of primary amino groups which comprises reacting together a dialkyl ketone and said aromatic amine at a temperature above 200° C. and under a pressure substantially above atmospheric pressure in the presence of iodine.

3. A process of producing a rubber antioxidant by combining dialkyl ketones and diaryl amines which comprises reacting together a dialkyl ketone and a non-substituted diaryl amine selected from the benzene and naphthalene series at a temperature above 200° C. and under a pressure substantially above atmospheric pressure in the presence of iodine.

4. A process of producing a rubber antioxidant by combining dialkyl ketones and diaryl amines which comprises reacting together acetone and diphenylamine at a temperature above 200° C. and under a pressure substantially above atmospheric pressure in the presence of iodine.

5. A process of producing a rubber antioxidant by combining dialkyl ketones and diaryl amines which comprises reacting together acetone and phenyl-naphthylamine at a temperature above 200° C. and under a pressure substantially above atmospheric pressure in the presence of iodine.

6. A process of producing a rubber antioxidant by combining dialkyl ketones anl diaryl amines which comprises reacting together acetone and phenyl-beta naphthylamine in the presence of iodine at a temperature above 200° C.

7. A process of producing a rubber antioxidant by combining dialkyl ketones and diaryl amines which comprises reacting together acetone and p,p'-di(beta naphthylamino) diphenyl methane in the presence of iodine at a temperature above 200° C.

8. A process of producing a rubber antioxidant by combining dialkyl ketones and diaryl amines which comprises reacting together a dialkyl ketone and a non-substituted diaryl secondary amine selected from the benzene and naphthalene series at a temperature of from about 210° C. to about 220° C. and a pressure of about 600 pounds per sq. in. in the presence of iodine, and subsequently removing excess ketone and water.

9. A process of producing a rubber antioxidant by combining dialkyl ketones and diaryl amines which comprises reacting together acetone and diphenylamine at a temperature of from about 210° C. to about 220° C. and a pressure of about 600 pounds per sq. in. in the presence of iodine, and subsequently removing excess ketone and water.

10. A process of producing a rubber antioxidant by combining dialkyl ketones and diaryl amines which comprises reacting together acetone and phenyl-naphthylamine at a temperature of from about 210° C. to about 220° C. and a pressure of about 600 pounds per sq. in. in the presence of iodine, and subsequently removing excess ketone and water.

11. A process of producing a rubber antioxidant by combining dialkyl ketones and diaryl amines which comprises reacting together acetone and phenyl beta naphthylamine at a temperature of from about 210° C. to about 220° C. and a pressure of about 600 pounds per sq. in. in the presence of iodine, and subsequently removing excess ketone and water.

Signed at Montclair, county of Essex, State of New Jersey, this 18th day of September, 1931.

WILLIAM P. ter HORST.